United States Patent
Ostlie et al.

(10) Patent No.: US 8,650,949 B1
(45) Date of Patent: Feb. 18, 2014

(54) LIQUID LEVEL SENSOR FREQUENCY OUTPUT SYSTEM

(75) Inventors: Mark R. Ostlie, Vergas, MN (US); Lou R. Calkins, Pinckney, MI (US)

(73) Assignee: S.J. Electro Systems, Inc., Detroit Lakes, MN (US)

( * ) Notice: Subject to any disclaimer, the term of this patent is extended or adjusted under 35 U.S.C. 154(b) by 388 days.

(21) Appl. No.: 13/044,836

(22) Filed: Mar. 10, 2011

Related U.S. Application Data

(60) Provisional application No. 61/340,087, filed on Mar. 11, 2010.

(51) Int. Cl.
*G01F 23/00* (2006.01)
(52) U.S. Cl.
USPC ............ 73/290 R; 73/290 V; 73/1.73; 73/305
(58) Field of Classification Search
USPC ......... 73/1.73, 290 V, 1.82, 1.83, 290 R, 305, 73/313, 314, 317; 340/612, 614–625
See application file for complete search history.

(56) References Cited

U.S. PATENT DOCUMENTS

| | | | | |
|---|---|---|---|---|
| 5,708,424 A | * | 1/1998 | Orlando et al. | 340/870.08 |
| 6,369,715 B2 | * | 4/2002 | Bennett et al. | 340/618 |
| 6,711,949 B1 | * | 3/2004 | Sorenson | 73/313 |
| 7,304,588 B2 | * | 12/2007 | Ingalsbe et al. | 340/870.16 |
| 7,441,569 B2 | * | 10/2008 | Lease | 141/95 |
| 8,079,245 B1 | * | 12/2011 | Owens et al. | 73/1.73 |
| 2004/0129075 A1 | * | 7/2004 | Sorenson | 73/313 |

* cited by examiner

*Primary Examiner* — Hezron E Williams
*Assistant Examiner* — Hoang Nguyen
(74) *Attorney, Agent, or Firm* — Michael S. Neustel

(57) ABSTRACT

A liquid level sensor frequency output system for efficiently communicating a liquid level with reduced power and increased accuracy. The liquid level sensor frequency output system generally includes a sensor that determines a liquid level, a transmitter in communication with the sensor that converts the level data to a signal having a frequency representing the liquid level, and a receiver that receives the signal, wherein the receiver calculates the liquid level based on the frequency of the signal. The calculated liquid level by the receiver can be transmitted to an output device such as a display, switch, warning system or pump.

20 Claims, 4 Drawing Sheets

LIQUID LEVEL SENSOR FREQUENCY OUTPUT SYSTEM

CROSS REFERENCE TO RELATED APPLICATIONS

I hereby claim benefit under Title 35, United States Code, Section 119(e) of U.S. provisional patent application Ser. No. 61/340,087 filed Mar. 11, 2010. The 61/340,087 application is currently pending. The 61/340,087 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to pressure sensor communication systems and more specifically it relates to a liquid level sensor frequency output system for efficiently communicating a liquid level with reduced power and increased accuracy.

2. Description of the Related Art

Any discussion of the related art throughout the specification should in no way be considered as an admission that such related art is widely known or forms part of common general knowledge in the field.

Fluid pressure transducers are utilized to measure fluid pressure to determine the fluid depth, fluid level, and other variables related to the fluid. Fluid pressure transducers are typically comprised of a pressure transducer that converts the fluid pressure to a direct current (DC) signal that can be utilized to provide a level measurement of fluid in a tank (e.g. septic tank), pumping chamber or other fluid tank. The DC electrical signal can be used to provide a measurement reading, provide a warning, activate a pump or perform other actions based on the measurement. The pressure transducer can be in communication with any external device such as but not limited to a pump controller, a circuit board, a display, a warning device and the like.

One problem with conventional pressure level DC signals is that they require a significant amount of power. Another problem with conventional pressure level DC signals is they are prone to providing inaccurate readings due to external electrical noise or signal. A further problem with conventional pressure level DC signals is that they require costly and sensitive electronics for the transmitter and the receiver.

Because of the inherent problems with the related art, there is a need for a new and improved liquid level sensor frequency output system for efficiently communicating a liquid level with reduced power and increased accuracy.

BRIEF SUMMARY OF THE INVENTION

A system for efficiently communicating a liquid level with reduced power and increased accuracy. The invention generally relates to a pressure sensor communication system which includes a sensor that determines a liquid level, a transmitter in communication with the sensor that converts the level data to a signal having a frequency representing the liquid level, and a receiver that receives the signal, wherein the receiver calculates the liquid level based on the frequency of the signal. The calculated liquid level by the receiver can be transmitted to an output device such as a display, switch, warning system or pump.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
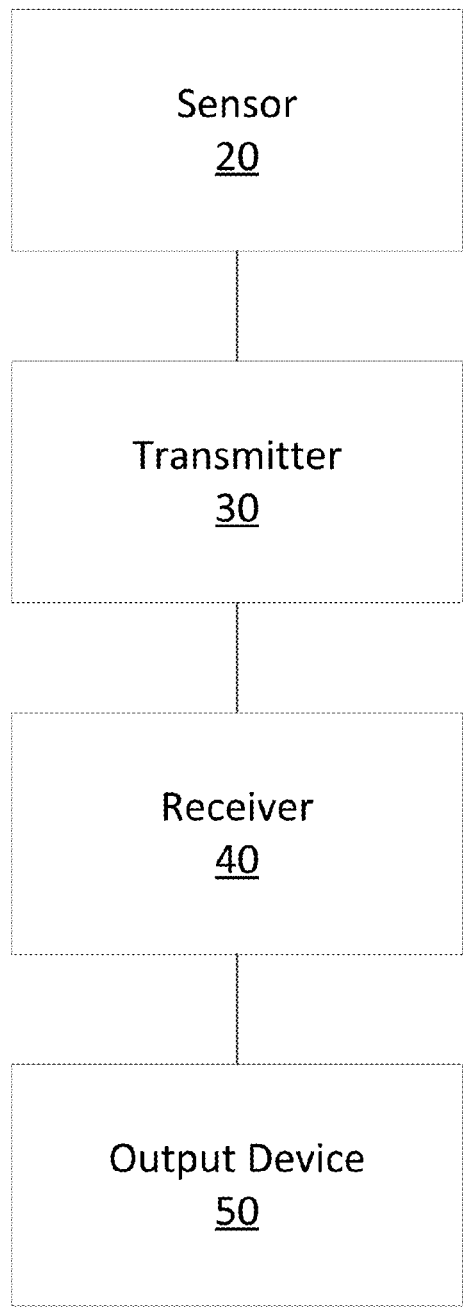
FIG. 1 is a schematic diagram illustrating the overall electrical components of the present invention and the communication between thereof.

A. Overview.

Turning now descriptively to the drawings, in which similar reference characters denote similar elements throughout the several views, FIGS. 1 through 5 illustrate a liquid level sensor frequency output system, which comprises a sensor 20 that determines a liquid level, a transmitter 30 in communication with the sensor 20 that converts the level data to a signal having a frequency representing the liquid level, and a receiver 40 that receives the signal, wherein the receiver 40 calculates the liquid level based on the frequency of the signal. The calculated liquid level by the receiver 40 can be transmitted to an output device 50 such as a display, switch, warning system or pump.

B. Sensor.

FIG. 1 illustrates a sensor 20 that determines a liquid level within a tank such as but not limited to a septic tank. The sensor 20 transforms the liquid level into a level output that is communicated to the transmitter 30. The sensor 20 and the transmitter 30 may be comprised of a single device or separate devices as can be appreciated. The sensor 20 may have a range of measurements such as but not limited to 0 to 8 feet or 0 to 16 feet.

The sensor 20 may be comprised of any type of sensor capable of measuring the liquid level within a tank such as but not limited to a pressure sensor, an ultrasonic sensor, optical sensor and the like. The level output from the sensor 20 is typically comprised of a direct current signal but may be comprised of a different type of signal. The level output may be communicated to the transmitter 30 wirelessly or via a wired connection.

C. Transmitter.

Figure 2:
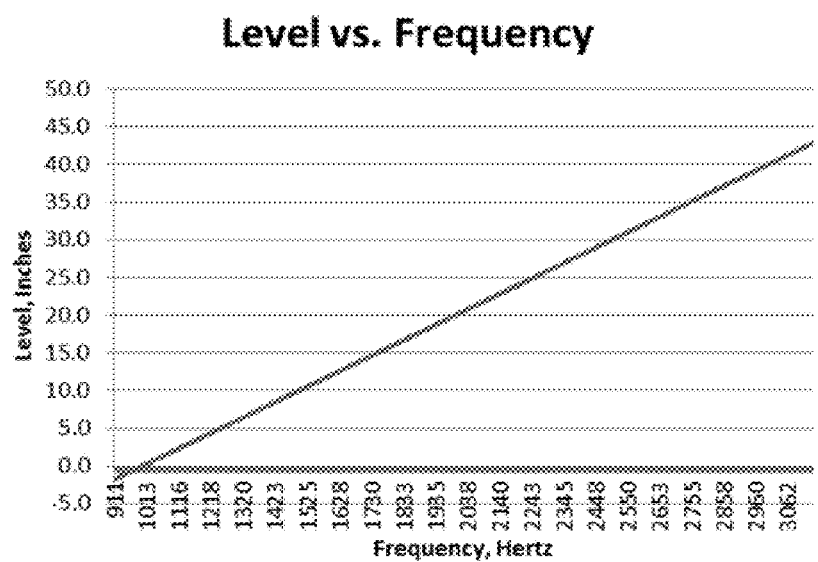
FIG. 2 is a chart illustrating a first embodiment of the present invention wherein the frequency of the signal is linear with respect to the liquid level.
Figure 3:
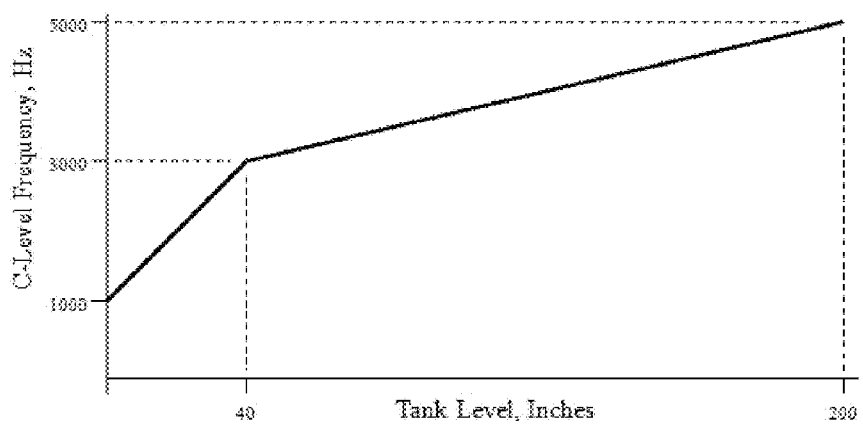
FIG. 3 is a chart illustrating a second embodiment of the present invention wherein the frequency of the signal is non-linear with respect to the liquid level.
Figure 4:
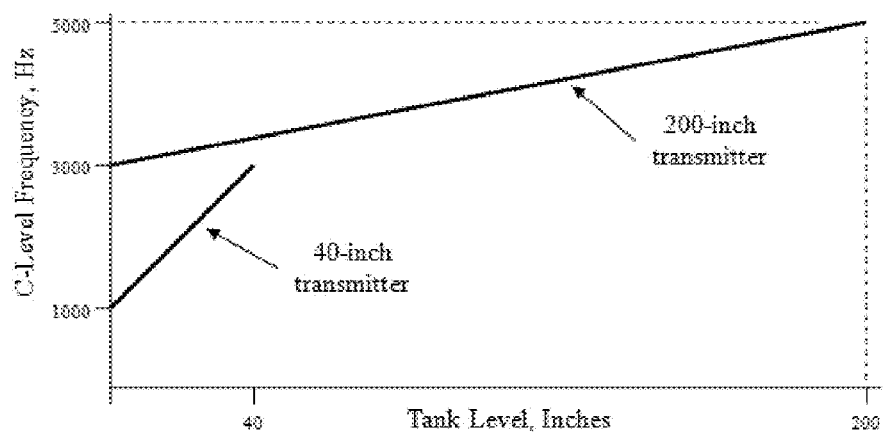
FIG. 4 is a chart illustrating a third embodiment of the present invention, optional to that of FIG. 2, wherein the frequency of the signal has a plurality of frequency ranges representing a corresponding plurality of different transmitters.
Figure 5:
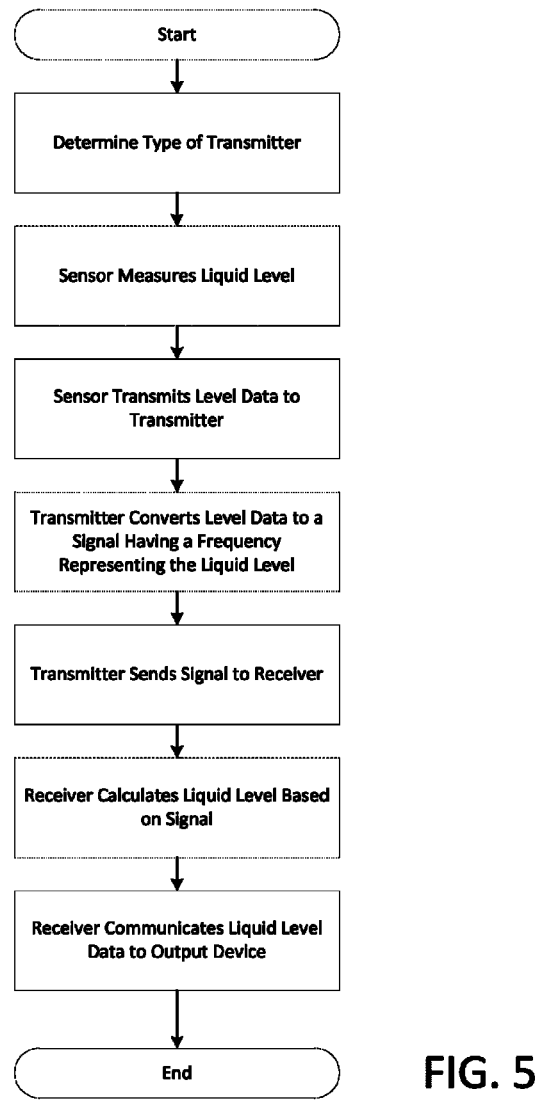
FIG. 5 is a flowchart illustrating the overall functionality of the present invention.

The transmitter 30 is in communication with the sensor 20 as further illustrated in FIG. 1 of the drawings. The transmitter 30 converts the level output to a signal having a frequency. The frequency of the signal represents the measured liquid level in the tank by the sensor 20. The frequency is calculated based on the liquid level in the tank. FIGS. 2, 3 and 4 provide illustrations of some exemplary frequency calculations suitable for use within the present invention. The signal from the transmitter 30 may be communicated to the receiver 40 in various manners such as but not limited to wirelessly or via a communication cable.

FIG. 2 illustrates where the frequency is preferably linear with respect to the liquid level within the tank. As illustrated in FIG. 2 of the drawings, as the liquid level measured by the sensor 20 increases or decreases, the frequency proportionately increases or decreases in a linear manner. It can be appreciated that the linear correspondence between the frequency and the liquid level may be inverse such that when the liquid level decreases, the frequency proportionately increases and vice-versa. It can be appreciated that the initial frequency representing a 0 measurement of liquid level in the tank may either be 0 itself or a baseline frequency (e.g. 911 Hz as illustrated in FIG. 2).

FIG. 3 illustrates a second embodiment of the present invention illustrating where the frequency is non-linear with respect to the liquid level within the tank. As illustrated in FIG. 3, the frequency is calculated based on the level output having a first slope and a second slope. The first slope represents a first level for the level output and the second slope represents a second level for the level output. The first slope is different from the second slope, wherein the first slope is preferably comprised of an initial range of liquid depths and is greater than the second slope. This may be employed where an extended range sensor 20 is used in place of a lower range sensor 20 with no control modification. FIG. 3 illustrates the first slope as being between 0 to 40 inches with the corresponding frequency being between 0 to 3,000 Hz. FIG. 3 further illustrates the second slope as being between 40 to 200 inches with the corresponding frequency being between 3,000 Hz to 5,000 Hz. As illustrated in FIG. 3 of the drawings, the first slope is preferably comprised of an initial range of liquid levels in the tank and has a steeper slope than the second slope to provide for increased resolution. For greater liquid levels, the second slope provides an increased range of liquid levels with a slightly reduced resolution.

FIG. 4 illustrates a third embodiment of the present invention that utilizes two or more frequency ranges to identify the identity (e.g. depth size) of the transmitter 30 so the receiver 40 can adjust accordingly. FIG. 4 illustrates the usage of a first range for a 40 inch transmitter 30 having a liquid level range of 0 to 40 inches and a frequency range of 1,000 Hz to almost 3,000 Hz. Hence, whenever a frequency is received by the receiver 40 within this first range, the receiver 40 determines that the identity of the transmitter 30 is a 40 inch transmitter 30. FIG. 4 further illustrates the usage of a second range for a 200 inch transmitter 30 having a liquid level range of 0 to 200 inches and a frequency range of 3,000 Hz to 5,000 Hz. Hence, whenever a frequency is received by the receiver 40 within this second range, the receiver 40 determines that the identity of the transmitter 30 is a 200 inch transmitter 30 and adjusts accordingly. This allows for the same receiver 40 to be utilized with different sizes of transmitters 30. It further can be appreciated that more than two frequency ranges may be utilized to represent more than two different types of transmitters 30.

Finally, the frequency and liquid level data illustrated in FIGS. 2 through 4 is merely for illustration purposes and should not limit the scope of the present invention by itself. Furthermore, it can be appreciated that an initiation signal initially communicated by the transmitter 30 to the receiver 40 is capable of indicating the identity of the transmitter 30 instead of utilizing different frequency ranges. In addition, various other types of data may be transmitted within the signal in addition to liquid level data.

D. Receiver.

FIG. 1 illustrates the receiver 40 which receives the signal with the specific frequency representing the liquid level in the tank. The receiver 40 calculates the liquid level in the tank based on the frequency of the signal with a reverse correlation used by the transmitter 30 as illustrated in FIGS. 2 through 4 of the drawings.

For example, as illustrated in FIG. 2 of the drawings, if the receiver 40 receives a signal having a frequency of approximately 1,525 Hz, the receiver 40 would calculate that the liquid level in the tank is approximately 10 inches in depth. As further illustrated in FIG. 2, if the receiver 40 receives a signal having a frequency of approximately 1,730 Hz, the receiver 40 would calculate that the liquid level in the tank is approximately 15 inches in depth. The process continues as the liquid level rises, lowers or is maintained. The same principal applies for the second embodiment illustrated in FIG. 3 of the drawings and the third embodiment illustrated in FIG. 4 of the drawings.

E. Output Device.

As illustrated in FIG. 1 of the drawings, an output device 50 is preferably in communication with the receiver 40. The receiver 40 provides the liquid level data to the output device 50 which can be utilized by the output device 50 to perform various actions. The output device 50 may be comprised of any device capable of receiving an electrical signal from the receiver 40 such as but not limited to displays, pumps, relays, switches, solenoids and heaters.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A liquid level sensor frequency output system, comprising:

a sensor that determines a liquid level within a tank and transforms said liquid level into a level output;

a transmitter in communication with said sensor, wherein said transmitter converts said level output to a signal having a frequency representing said liquid level and transmits said signal, wherein said frequency is calculated based on said liquid level; and a receiver that receives said signal, wherein said receiver calculates said liquid level based on said frequency of said signal;

wherein said transmitter communicates to said receiver an identity for said transmitter.

2. The liquid level sensor frequency output system of claim 1, wherein said level output is comprised of a direct current signal.

3. The liquid level sensor frequency output system of claim 1, wherein said signal is communicated via a communication cable between said transmitter and said receiver.

4. The liquid level sensor frequency output system of claim 1, wherein said signal is communicated wirelessly between said transmitter and said receiver.

5. The liquid level sensor frequency output system of claim 1, wherein said frequency is substantially linear with respect to said liquid level.

6. The liquid level sensor frequency output system of claim 1, wherein said frequency is non-linear with respect to said liquid level.

7. The liquid level sensor frequency output system of claim 1, wherein a frequency range of said frequency represents said identity for said transmitter, wherein said identity is comprised of a level range for said transmitter.

8. The liquid level sensor frequency output system of claim 1, including an initiation signal communicated by said transmitter to said receiver indicating said identity for said transmitter, wherein said identity is comprised of a level range for said transmitter.

9. The liquid level sensor frequency output system of claim 1, wherein said frequency is calculated based on said level output having a first slope and a second slope, wherein said first slope represents a first level for said level output and wherein said second slope represents a second level for said level output, wherein said first slope is different from said second slope.

10. The liquid level sensor frequency output system of claim 9, wherein said first slope is greater than said second slope.

11. The liquid level sensor frequency output system of claim 1,
including an output device in communication with said receiver.

12. A liquid level sensor frequency output system, comprising:
a sensor that determines a liquid level within a tank and transforms said liquid level into a level output, wherein said level output is comprised of a direct current signal;
a transmitter in communication with said sensor, wherein said transmitter converts said level output to a signal having a frequency representing said liquid level and transmits said signal, wherein said frequency is calculated based on said liquid level;
wherein said frequency is substantially linear with respect to said liquid level;
wherein a frequency range of said frequency represents an identity for said transmitter,
wherein said identity is comprised of a level range for said transmitter;
a receiver that receives said signal, wherein said receiver calculates said liquid level based on said frequency of said signal; and
an output device in communication with said receiver.

13. A liquid level sensor frequency output system, comprising:
a sensor that determines a liquid level within a tank and transforms said liquid level into a level output;
a transmitter in communication with said sensor, wherein said transmitter converts said level output to a signal having a frequency representing said liquid level and transmits said signal, wherein said frequency is calculated based on said liquid level; and
a receiver that receives said signal, wherein said receiver calculates said liquid level based on said frequency of said signal;
wherein said frequency is calculated based on said level output having a first slope and a second slope, wherein said first slope represents a first level for said level output and wherein said second slope represents a second level for said level output, wherein said first slope is different from said second slope.

14. The liquid level sensor frequency output system of claim 13, wherein said first slope is greater than said second slope.

15. The liquid level sensor frequency output system of claim 13, wherein said level output is comprised of a direct current signal.

16. The liquid level sensor frequency output system of claim 13, wherein said signal is communicated wirelessly between said transmitter and said receiver.

17. The liquid level sensor frequency output system of claim 13, wherein said frequency is substantially linear with respect to said liquid level.

18. The liquid level sensor frequency output system of claim 13, wherein said frequency is non-linear with respect to said liquid level.

19. The liquid level sensor frequency output system of claim 13, wherein a frequency range of said frequency represents said identity for said transmitter, wherein said identity is comprised of a level range for said transmitter.

20. The liquid level sensor frequency output system of claim 13, including an initiation signal communicated by said transmitter to said receiver indicating an identity for said transmitter, wherein said identity is comprised of a level range for said transmitter.

* * * * *